US009877128B2

(12) United States Patent
Cierna et al.

(10) Patent No.: US 9,877,128 B2
(45) Date of Patent: Jan. 23, 2018

(54) NOISE INDEX DETECTION SYSTEM AND CORRESPONDING METHODS AND SYSTEMS

(71) Applicant: MOTOROLA MOBILITY LLC, Chicago, IL (US)

(72) Inventors: Dusan Macho Cierna, Arlington Heights, IL (US); Robert T. Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/872,314

(22) Filed: Oct. 1, 2015

(65) Prior Publication Data
US 2017/0099556 A1    Apr. 6, 2017

(51) Int. Cl.
*H04R 29/00* (2006.01)
*G10L 25/84* (2013.01)
(Continued)

(52) U.S. Cl.
CPC ............ *H04R 29/004* (2013.01); *G10L 25/84* (2013.01); *H04M 1/725* (2013.01); *H04R 1/326* (2013.01); *H04R 3/00* (2013.01); *G10L 25/72* (2013.01)

(58) Field of Classification Search
CPC .. H04R 1/1083; H04R 2430/01; H04R 5/033; H04R 2201/107; H04R 2420/07;
(Continued)

(56) References Cited
U.S. PATENT DOCUMENTS

2003/0179887 A1* 9/2003 Cronin ..................... H03G 3/32
381/57
2006/0069548 A1* 3/2006 Matsuura ........... G01C 21/3629
704/200.1
(Continued)

FOREIGN PATENT DOCUMENTS
WO    2011/141761    11/2011

OTHER PUBLICATIONS

Citygram-Sound, Denter for Data Science, NYU, http://cds.nyu.edu/projects/citygram-sound/, downloaded from the Internet: Sep. 22, 2015.
(Continued)

*Primary Examiner* — Akelaw Teshale
(74) *Attorney, Agent, or Firm* — Philip H. Burrus, IV

(57) ABSTRACT

An electronic device (200) includes a user interface (205), a communication circuit (206), and an audio capture device (212) to receive ambient audio signals from an environment about the electronic device. A voice control interface engine (214) is operable with the audio capture device to process signals received from the audio capture device to identify at least some speech from the ambient audio signals. One or more processors (203) are operable with the voice control interface engine to compute a noise index as a function of the ambient audio signals and the at least some speech. The one or more processors can optionally identify a source of the at least some speech. Where the noise index exceeds a predefined criterion, the one or more processors can execute a communication operation on one or more of the user interface or the communication circuit.

17 Claims, 12 Drawing Sheets

(51) Int. Cl.
*H04R 1/32* (2006.01)
*H04R 3/00* (2006.01)
*H04M 1/725* (2006.01)
*G10L 25/72* (2013.01)

(58) Field of Classification Search
CPC . H04R 29/00; H04R 1/08; H04R 1/10; H04R 2499/11; H04R 25/405; H04R 29/001; H04R 29/008; H04R 3/005; H04R 5/04; H04R 1/028; H04R 1/105; H04R 2201/403; H04R 3/00; H04R 3/002; H04R 1/1008; H04R 2460/01; H04R 2460/05; H04R 2227/003; H04R 2410/01; H04R 2430/21; H04R 27/00; H04R 1/1041; H04R 1/406
USPC .......... 381/57, 56, 71.1, 107, 58, 59, 60, 72, 381/104, 106, 119, 306, 315, 321, 66, 74, 381/86, 71.6, 309, 92, 317, 320, 71.2, 381/71.4, 71.7
See application file for complete search history.

(56) References Cited

U.S. PATENT DOCUMENTS

| | | | |
|---|---|---|---|
| 2009/0048829 A1* | 2/2009 | Bodin | G10L 15/22 704/235 |
| 2009/0240497 A1* | 9/2009 | Usher | H04R 1/10 704/235 |
| 2009/0326942 A1 | 12/2009 | Fulop | |
| 2010/0088365 A1* | 4/2010 | Varney | H04L 67/24 709/203 |
| 2010/0153101 A1 | 6/2010 | Fernandes | |
| 2012/0243694 A1 | 9/2012 | Bradley et al. | |
| 2014/0108448 A1* | 4/2014 | Daniel | G06F 17/30967 707/769 |
| 2015/0078180 A1* | 3/2015 | Rajakarunanayake | H04W 40/16 370/252 |
| 2015/0195641 A1 | 7/2015 | Di Censo et al. | |
| 2015/0332564 A1* | 11/2015 | Weinberg | G08B 6/00 340/407.1 |
| 2016/0180658 A1* | 6/2016 | Degrassi | G07G 1/00 340/384.7 |
| 2016/0198030 A1* | 7/2016 | Kim | G10L 21/0216 379/392.01 |
| 2016/0205267 A1* | 7/2016 | Vaughn | H04M 19/04 455/566 |
| 2016/0210988 A1* | 7/2016 | Lim | G10L 25/51 |

OTHER PUBLICATIONS

3M Quest Edge eg4 Datalogging Personal Noise Dosimeter; Unknown publication date but believed to be prior to filing or present application; http://www.raeco.com/products/noise/quest_edgedosimeter.html.

GabStopper by Kadtronix; Unknown Publication Date but believe to be prior to filing of present application; http://gabstopper.kadtronix.com/gs_info.html.

NoiseGuide by Noisemeters; Unknown Publication date but beleived to be prior to filing of present application; http://www.noisemeters.com/product/soundear/noiseguide/.

Sound Alert by Noise Meters; Unknown publication date but believed to be prior to filing of present application; http://www.noisemeters.com/product/soundalert/.

* cited by examiner

NOISE INDEX DETECTION SYSTEM AND CORRESPONDING METHODS AND SYSTEMS

BACKGROUND

Technical Field

This disclosure relates generally to electronic devices, and more particularly to electronic devices having audio capture capabilities.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications and data communications for text messaging, Internet browsing, commerce such as banking, and social networking. The circumstances under which users of mobile communication device use their devices varies widely as well.

In addition, the environments in which mobile communication devices are used can vary. Some environments are quiet, while others can be quite noisy. Some environments are rife with what is known as "auditory pollution." Audible noise from conversations, events, gatherings, and occurrences can be distracting, unwanted, and irrelevant to an owner of a mobile communication device. It can, at times, be difficult to focus on ones thoughts or upon nearby conversations when the amount of surrounding auditory pollution is high.

Some mobile devices include systems to combat auditory pollution from interfering with the operation of the mobile communication device itself. For example, some devices include noise cancelation systems that attempt to filter background audio signals from a user's voice so that a third party, perhaps engaged in a telephone conversation with the user, hears more of the user's voice and less of the background noise. Such noise canceling systems help to filter out some audible signals. However, they do nothing to limit the auditory pollution from occurring in the first place. Consequently, in the previous example of a telephone conversation, the third party may hear less auditory pollution. However, the user still hears it all as his ears are not equipped with noise canceling technology. His concentration therefore remains distracted. It would be advantageous to have an improved device, system, and corresponding methods to help reduce the incidence—not just the effects—of auditory pollution.

Figure 1:
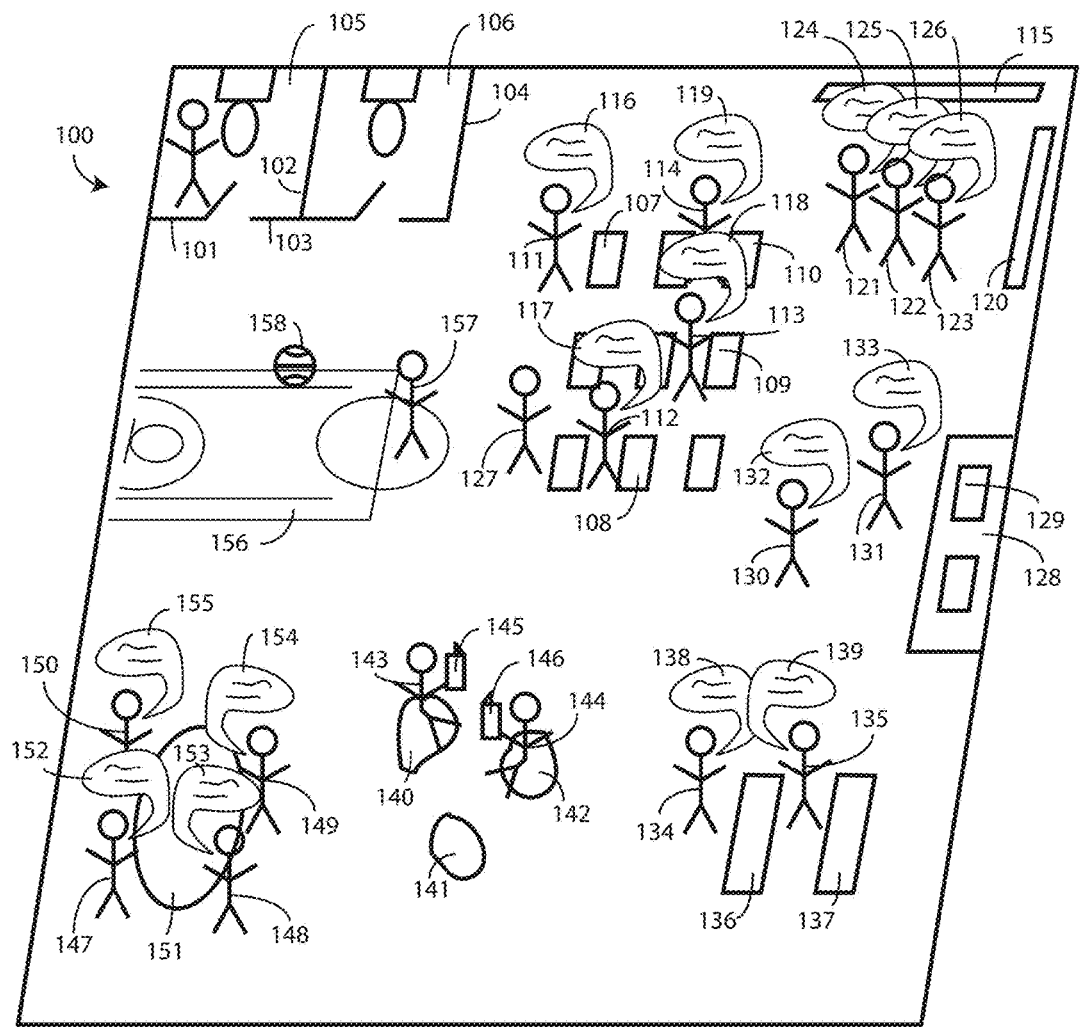
FIG. 1 illustrates one explanatory prior art environment in which auditory pollution can occur.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to capturing ambient audio signals, determining at least some speech from the ambient audio signals, computing a noise index as a function of the ambient audio signals and the speech, and executing a communication operation when the noise index exceeds at least one predetermined criterion. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of determination of a noise index and executing one or more operations in response thereto as described herein. The non-processor circuits may include, but are not limited to, a radio receiver, a radio transmitter, signal drivers, clock circuits, power source circuits, and user input devices. As such, these functions may be interpreted as steps of a method to perform determination of the noise index, identification of one or more speakers, performance of communication operations to reduce auditory pollution, and so forth. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Many businesses, schools, colleges, community centers, and so forth are beginning to adopt what are known as "open space" designs. In open space designs, there are very few—if any—walls. Desks and workspaces are generally mobile so that users can move them into collaborative arrangements. Illustrating by example, FIG. 1 shows an open space office design 100. As shown in FIG. 1, the only walls 101,102,103,104 of the open space office design 100 are around the bathrooms 105,106.

In this illustrative open space office design 100, a plurality of desks 107,108,109,110 is arranged centrally in a group. There are no walls between these desks 107,108,109,110. Consequently, when people 111,112,113,114 are seated at the desks 107,108,109,110, their conversations 116,117,118, 119 can be easily overheard.

Two whiteboards 115,120 are positioned in a corner of the open space office design 100. People 121,122,123 can gather there to draw on the whiteboards 115,120 and collaborate. Frequently, brainstorming sessions occur around these whiteboards 115,120. While this collaboration in the open space office design 100 can result in some brilliant ideas, the conversation 124,125,126 accompanying the collaboration can be distracting for an individual 127 that is not involved in the collaboration.

Common areas, such as a coffee station 128 with a microwave 129 can also be areas where auditory pollution arises. In the illustrative embodiment of FIG. 1, two people 130,131 are having conversations 132,133 about their children's soccer games. This might promote collegiality, but the conversations 132,133 can be very distracting to the poor individual 127 who is quietly working on a large project with a tight deadline.

Since there are no walls, some people 134,135 may eat lunch at group tables 136,137. The aroma from their leftover meals can be distracting to those trying to work due to the fact that the open space office design 100 includes no walls. Their conversations 138,139 are equally distracting.

To provide people with more comfortable—and hopefully creativity provoking—spaces, this explanatory open space office design 100 includes several beanbag chairs 140,141, 142. Here, two people 143,144 have elected to take a break from work and are reading books 145,146. Thankfully, at least to individual 127, they are not contributing to the overall auditory pollution.

As shown in FIG. 1, a number of people 147,148,149,150 are having a meeting at a meeting table 151. Here, the meeting is becoming quite heated, as each person 147,148, 149,150 is engaging in loud conversations 152,153,154,155. This type of meeting can be a tremendous contributor to auditory pollution.

The final stop on the tour of the open space office design 100 shows that a recreational space 156 has been included to allow workers to "blow off some steam" when not engaged in work. In this illustrative example, a worker 157 is "shooting hoops." The bouncing ball 158 contributes to some auditory pollution. However, the worker 157 is not talking, which results in this recreational space 156 being quitter than the event occurring at the meeting table 151.

It is clear that the open space office design 100 of FIG. 1 offers an advantage of ease of interaction. However, when individual 127 is trying to focus on his project, the cumulative auditory pollution becomes distracting. Auditory pollution from office noise such as lengthy discussions, talking on the phone, meetings, or conference call conversations, may have a negative impact on the productivity of the individual 127. Some studies suggest that if individual 127 is subjected to auditory pollution in the form of conversation while he is reading or writing, his productivity will drop by more than sixty percent. In addition, the auditory pollution distracts passive listeners, often without such distractions being consciously noticed.

Despite the propensity for creating large amounts of auditory pollution, many companies, educational institutions, and other organizations are opting to use open space office designs 100. Some statistics show as many as seventy percent of US corporations employing some form of open space office design 100. With this in mind, there is a pressing need to address the problem of auditory pollution. Embodiments of the disclosure do just this. In one embodiment, for example, a mobile communication device such as a smartphone, tablet computer, laptop computer, or other device is configured to monitor auditory pollution. In one or more embodiments, the mobile communication device further is equipped with tools to help reduce auditory pollution at the source as well.

In one embodiment, one or more processors of an electronic device are operable with an audio capture device and a voice control interface engine. The one or more processors can cause the audio capture device to continually capture ambient audio signals from an environment about the electronic device. The voice control interface engine can then process signals received from the audio capture device to identify at least some speech from the ambient audio signals.

In some embodiments, the voice control interface engine is further operable to determine the source of the speech, be it the owner of the electronic device or a known or unknown third party. Working with the audio capture device and the voice control interface engine, the one or more processors can, in one embodiment, detect distracting ambient noises such as loud and lengthy conversations, phone calls, or conference calls. In one or more embodiments the one or more processors can further calculate, based upon one or both of qualitative factors or quantitative factors, a noise index to determine when the ambient noises reach the level of auditory pollution.

In one or more embodiments, a location detector can be operable with the one or more processors. The one or more processors can then track the location of the electronic device as ambient audio signals are received. In one or more embodiments, the one or more processors can then store the location of the electronic device and a corresponding noise index occurring at the location in tone or more memory devices as a map. The map can include a plurality of locations, with each location having associated therewith with a corresponding noise index. Each time ambient audio or noise readings are made, the one or more processors can annotate the map to create a floor plan that depicts the amounts of office noise at different locations within a given area.

In one or more embodiments, the one or more processors can use the map to obtain information about the location of less noisy areas, such as work desks. The one or more processors can then make recommendations to the owner of the electronic device by executing communication operations that present the selected quiet areas on a user interface component such as the display of the electronic device. Similarly, the one or more processors can locate discussion areas, such as conference rooms or kitchen areas, to provide recommendations of locations where the levels of noise are expected to be low. To avoid situations where these areas may be noisy, e.g., the coffee station 128 of FIG. 1 above where the two people 130,131 were having conversations 132,133 about their children's soccer games, or the situation where a number of people 147,148,149,150 were having a meeting at a meeting table 151, in one or more embodiments the one or more processors can access calendar event information to determine meetings, lunch times, company events, meeting room reservations, or individual appointments to help determine when noise levels should be low. Similarly, the one or more processors can use the calendar event information to discount noise indices when high noise levels are expected, e.g., when a town hall meeting is occurring. Alternatively, in other embodiments, the one or more processors may only receive ambient audio signals from the environment about the electronic device when the electronic device is at a specific location, e.g., when the owner of the electronic device is sitting at his desk. This location specific feature can be user definable, or can occur automatically as a function of global policies or procedures. For example, the user input may cause the one or more processors to receive ambient audio signals and/or execute communication operations only when the device is within a predefined distance of the user's desk. Alternatively, the one or more processors may have knowledge of a predefined distribution of fixed quiet or discussion areas at a given location, such as personal desks, micro-kitchens, and so forth. In such embodiments, the one or more processors may only capture ambient audio signals and/or execute communication operations when the electronic device is within a predefined quiet or discussion area.

In one or more embodiments, the voice control interface engine can be configured to segment the speech from the ambient audio signals in accordance with different speakers. For example, the voice control interface engine might identify each of person 147,148,149,150 at the meeting table 151 by voice recognition. Additionally, in one or more embodiments the one or more processors may use the voice control interface engine to cluster the time intervals of a repetitive speaker.

In one or more embodiments, when a noise index that is calculated as a function of the ambient audio signals and the speech exceeds a predefined criterion, the one or more processors can execute a communication operation using either the user interface of the electronic device or the communication circuit of the electronic device. For example, the one or more processors may send, with a communication circuit, a "reminder" text message to a repetitive speaker or to a loud persistent speaker asking them to be quiet. In one or more embodiments, the one or more processors can determine the identity of an owner of a mobile device located at the source of the repetitive noise. This information can be stored in memory for future use. Alternatively, this information can be used to identify the repetitive speaker automatically. As an alternative, in one embodiment the electronic device is equipped with a directional audio output device and can broadcast—in a direction from which the speech was received—an announcement asking the repetitive speaker to be quiet.

In one or more embodiments, the one or more processors can, with the voice control interface engine, identify the owner of the electronic device by identifying at least some speech from the captured ambient audio signals. Embodiments of the disclosure contemplate that there will be situations where the owner of the electronic device fails to realize that he is partially responsible for the auditory pollution. In those situations, the one or more processors can execute a communication operation by presenting a notification on the display asking the owner of the device to be quieter when he generates an excessive office noise pollution in quiet areas.

As noted above, in one or more embodiments, the one or more processors are operable to compute a noise index as a function of the ambient audio signals and the speech therein. This noise index can be comprise qualitative measurement factors of the ambient audio signals and/or quantitative measurement factors of the ambient audio signals. Examples of qualitative measurements include one or more of a speaker variability measurement or a speaker intelligibility measurement, while examples of quantitative measurements include one or more of a sound loudness level, a duration that the ambient audio signals are above a predefined loudness threshold, or a ratio of the at least some speech to the ambient audio signals. Accordingly, in one or more embodiments the noise index can be a function of length, intelligibility, loudness of the spoken interaction, as well as the speaker variability in it. The noise index calculations can be instantaneous, or alternatively can be averaged to provide a summary report for a given period of time, e.g., a day or a week. In one or more embodiments, an owner of the electronic device can use this information to review his noise exposure at any moment during the day. In one or more embodiments, the noise index can be used to trigger communication operations in the form of noise alerts, such as when the noise index exceeds a predefined criterion. ON Guard can be set to alert the owner about high office noise levels.

Where multiple electronic devices are similarly configured, these electronic devices can be operable with a server complex. For example, when multiple electronic devices are measuring ambient audio signals and corresponding speech, information such as location, noise index, identification of speakers, etc., can be uploaded to the server complex for further processing. Illustrating by example, in one embodiment the server complex can generate a "heat map" showing a map of a plurality of locations on a display of a user interface with the each location comprising a graphical presentation indicative of the average noise index. Such a heat map provides a user with a graphical representation of the levels of office noise at different locations on the floor.

Advantageously, embodiments of the disclosure provide devices, systems, and methods than are capable of measuring ambient noise, distinguishing spoken interaction from other non-speech noises, e.g. keyboard typing. Moreover, embodiments of the disclosure are advantageously capable of performing speaker segmentation, clustering, and/or identification. Embodiments of the disclosure can use information about location to identify quiet and/or discussion areas. Additionally, when equipped with directional microphones, embodiments of the disclosure are capable of detecting the direction of noise sources. Still other advantages will be obvious to those of ordinary skill in the art having the benefit of this disclosure.

Figure 2:
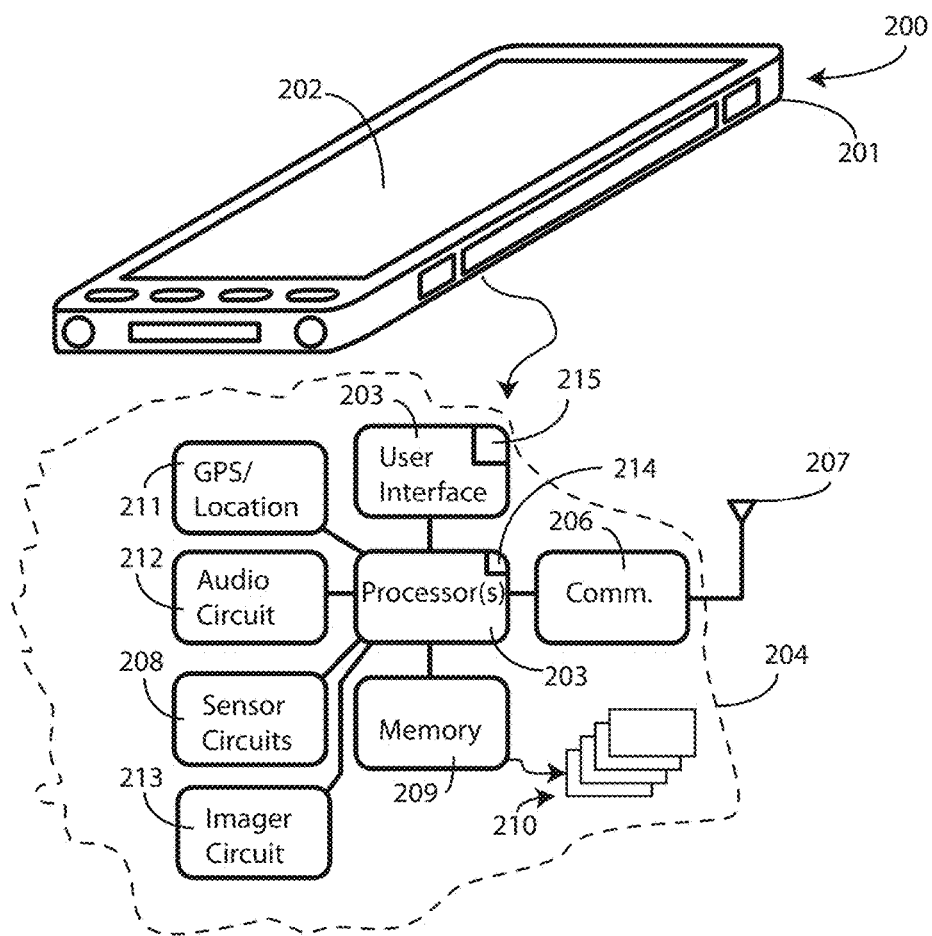
FIG. 2 illustrates one explanatory device in accordance with one or more embodiments of the disclosure.

Turning now to FIG. 2, illustrated therein is one explanatory electronic device 200 configured in accordance with one or more embodiments of the disclosure. The explanatory electronic device 200 is shown as a smart phone for ease of illustration. However, it will be obvious to those of ordinary skill in the art having the benefit of this disclosure that other portable electronic devices may be substituted for the explanatory smart phone as noted above. The electronic device 200 may be configured as a palm-top computer, a tablet computer, a gaming device, wearable computer, a remote controller, a media player, laptop computer, portable computer, or other electronic device.

The electronic device 200 includes a housing 201. In one embodiment, a display 202 is disposed along the front surface of the housing 201 of the electronic device 200. In one embodiment, the display 202 is configured to provide visual output, images, or other visible indicia to a user. For example, when one or more processors 203 of the electronic device 200 perform a communication operation, in one embodiment this comprises the presentation of notifications or other information on the display 202. In one embodiment, the display 202 comprises an organic light emitting diode (OLED) device. However, it should be noted that other types of displays, including liquid crystal displays, would be obvious to those of ordinary skill in the art having the benefit of this disclosure.

In one embodiment, the display 202 comprises a touch sensor to form touch sensitive display configured to receive user input across the surface of the display 202. The display 202 can also be configured with a force sensor. Where configured with both a touch sensor and force sensor, one or more processors 203 of the electronic device 200, operable with the touch sensor and the force sensor, can determine not only where the user contacts the display 202, but also how much force the user employs in contacting the display 202.

In FIG. 2, the explanatory electronic device 200 is shown illustratively with a schematic block diagram 204. The schematic block diagram 204 illustrates various components and modules suitable for inclusion in the electronic device 200. It will be clear to those of ordinary skill in the art having the benefit of this disclosure that the components and modules can be used in different combinations, with some components and modules included and others omitted.

In this embodiment, the electronic device 200 includes a user interface 205, which can include the display 202. In one embodiment, the user interface 205 includes one or more audio output devices 215, such as one or more loudspeakers. A single loudspeaker can be included. Optionally, two or more loudspeakers can be included for selective audio output beam steering. For example, in one or more embodiments the loudspeakers can perform a beam steering operation to deliver audible output toward the source of auditory pollution. The one or more processors can then select between the first loudspeaker and the second loudspeaker to beam steer audio reception toward a source of auditory pollution. For example, the loudspeakers may cause the audio output, "Shut Up!" to be delivered toward a repetitive speaker.

The illustrative electronic device 200 also includes a communication circuit 206 that can be configured for wired or wireless communication with one or more other devices or networks, one example of which will be described in more detail below with reference to FIG. 10. Such networks can include a wide area network, such as a Code Division Multiple Access (CDMA) network, a Global System for Mobile communication (GSM) network, a Push-to-Talk (PTT) network, Dual Band Universal Mobile Telecommunications System (UMTS) networks, and direct communication networks. Alternatively, the network can be a local area network or personal area network as well. Such networks can include peer-to-peer or ad hoc communications such as HomeRF, Bluetooth and IEEE 802.11 (a, b, g or n), and other forms of wireless communication such as infrared technology. The communication circuit 206 can include wireless communication circuitry, one of a receiver, a transmitter, or transceiver, and one or more antennas 207.

The electronic device 200 includes one or more processors 203, which can have one or more control circuits. The one or more processors 203 are responsible for performing the various functions of the device. The one or more processors 203 can be a microprocessor, a group of processing components, one or more Application Specific Integrated Circuits (ASICs), programmable logic, or other type of processing device. The one or more processors 203 can be operable with the user interface 205 and the communication circuit 206, as well as various sensors 208 that can be coupled to the one or more processors 203 via interface connections.

The one or more processors 203 can be configured to process and execute executable software code to perform the various functions of the electronic device 200. A storage device, such as memory 209, stores the executable software code used by the one or more processors 203 for device operation. The executable software code used by the one or more processors 203 can be configured as one or more modules 210 that are operable with the one or more processors 203. Such modules 210 can store instructions, control algorithms, and so forth. The instructions can instruct processors or one or more processors 203 to perform the various steps, ambient noise detection, and methods described below.

In one embodiment, the one or more processors 203 can be responsible for performing the primary functions of the electronic device 200. For example, in one embodiment the one or more processors 203 comprise one or more circuits operable with the user interface 205 to present presentation information to a user on the display 202 of the user interface 205.

In one or more embodiments, the one or more processors 203 of the electronic device 200 include a voice control interface engine 214. The voice control interface engine 214 can include hardware, executable code, modules 210, and speech monitor executable code in one embodiment. The voice control interface engine 214 can include, stored in memory 218, basic speech models, trained speech models, or other modules that are used by the voice control interface engine to receive and identify speech. In one embodiment, the voice control interface engine 214 can include a voice recognition engine to identify speech extracted from ambient audio signals. Regardless of the specific implementation utilized in the various embodiments, the voice control interface engine 214 can access various speech models to identify speakers of different speech.

An imager 213, such as a digital camera or other image sensor, can be operable with the one or more processors 203. In one embodiment, the imager 213 is capable of both capturing images and previewing images. When images are captured, the captured image is recorded to memory 209. When images are previewed, the images are delivered to the one or more processors 203 for presentation on the display 202. However, when images are being previewed, in one embodiment there is no need to write the image to memory 209. Instead, electronic signals can be delivered from the imager 213 to the one or more processors 203 with only temporary buffering occurring in the one or more processors 203. Thus, previewed images do not consume non-volatile area in the memory 209, while captured images do.

In one embodiment, the imager 213 can be configured to identify people within an environment of the electronic device 200. For example, the imager 213 may be able to process a captured image to identify human shapes in the image. In other embodiments, the imager 213 may include a gaze detector configured to detect a gaze direction from a person. Generally speaking, gaze detectors comprise sensors for detecting the user's gaze point. They can optionally include sensors for detecting the alignment of a user's head in three-dimensional space. Electronic signals can then be delivered from the sensors to the one or more processors 203 for computing the direction of user's gaze, or the number of people gazing at the electronic device 200, in three-dimensional space.

One or more sensors 208 can be operable with the one or more processors 203. These sensors 208 can include, in any combination, a light sensor, an infrared sensor, a motion sensor, and optionally biometric sensors.

A light sensor, where included, can detect changes in optical intensity, color, light, or shadow in the near vicinity of the electronic device 200. The light sensor can be configured as an image-sensing device that captures successive images about the device and compares luminous intensity, color, or other spatial variations between images to detect motion or the presence of an object near the electronic device 200. Such sensors can be useful in determining at which side of the electronic device 200 a user is standing. The one or more processors can use this information when capturing ambient audio signals to detect the source of auditory pollution by beam steering the audio capture device 212 to more accurately capture audio information. An infrared sensor can be used in conjunction with, or in place of, the light sensor. The infrared sensor can be configured to operate in a similar manner, but on the basis of infrared radiation rather than visible light.

A motion sensor can be included to detect motion of the electronic device 200. In one embodiment, the motion sensor includes an accelerometer. The accelerometer can also be used to determine the spatial orientation of the electronic device 200 in three-dimensional space by detecting a gravitational direction. In addition to, or instead of, the accelerometer, an electronic compass can be included to detect the spatial orientation of the electronic device 200 relative to the earth's magnetic field. Similarly, one or more gyroscopes can be included to detect rotational motion of the electronic device 200. The gyroscope can be used to determine the spatial rotation of the electronic device 200 in three-dimensional space.

One or more biometric sensors can also be included for sensing biometric information relating to a particular user. The electronic device 200 can be configured to operate in a health-monitoring mode to measure a user's potential distraction and lack of concentration by monitoring one or more wellness sensors. Illustrating by example, a heart monitor can be configured to employ EKG or other sensors to monitor a user's heart rate. The heart monitor can include electrodes configured to determine action potentials from the skin of a user. A temperature monitor can be configured to monitor the temperature of a user. A pulse monitor can be configured to monitor the user's pulse. A moisture detector can be configured to detect the amount of moisture present on a person's skin. The moisture detector can be realized in the form of an impedance sensor that measures impedance between electrodes. As moisture can be due to external conditions, e.g., rain, or user conditions, perspiration, the moisture detector can function in tandem with ISFETS configured to measure pH or amounts of NaOH in the moisture or a galvanic sensor to determine not only the amount of moisture, but whether the moisture is due to external factors, perspiration, or combinations thereof. Information from these biometric sensors can be used to indicate a person's stress level, which is likely to increase in the presence of auditory pollution due to the person becoming distracted. For example, if a person's heart rate, pulse, and perspiration all begin to increase, this can be a sign that the person is becoming ever more frustrated because someone is chatting loudly about their new baby while the person is trying to focus on a cash flow statement. The one or more processors 203 can use this information to trigger the audio capture device 212 and/or voice control interface engine 214 so that the auditory pollution can be stopped to lower the person's stress level.

An audio capture device 212 can be operable with the one or more processors 203. The audio capture device 212 can include one or more microphones to receive voice input, voice commands, ambient audio noise in the event of an emergency, and other audio input. A single microphone can be included. Optionally, two or more microphones can be included for selective beam steering. The one or more processors can then select between the first microphone and the second microphone to beam steer audio reception toward a source of auditory pollution. The audio capture device 212 can record audio to the memory 209. Alternatively, as will be discussed in more detail below with reference to FIG. 10, information captured by the audio capture device 212 can be delivered through the communication circuit 206 to a server complex.

In one or more embodiments, a location detector 211 is included. In one embodiment, the location detector 211 is a global positioning system device for determining where the electronic device 200 is located. (Note that the global positioning system device can also be used to determine the spatial orientation of the electronic device 200 in three-dimensional space by determining the change in position of the device relative to the earth.) The global positioning system device can be configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device autonomously or with assistance from terrestrial base stations, for example with assistance from a cellular communication network or other ground based network, or as part of a Differential Global Positioning System (DGPS), as is well known by those having ordinary skill in the art. While a global positioning system device is one example of a location sensor, it will be clear to those of ordinary skill in the art having the benefit of this disclosure that other location determination devices, such as electronic compasses or gyroscopes, could be used as well. Similarly, the location detector 211 can determine the location of the electronic device 200 by triangulating signals from Wi-Fi nodes or terrestrial cellular towers or combinations thereof.

In one embodiment, the audio capture device 212 is operable to receive ambient audio signals from an environment about the electronic device 200. When these ambient audio signals are received, the voice control interface engine 214 can process electronic signals corresponding to the ambient audio signals to identify at least some speech from the ambient audio signals. Once this occurs, the one or more processors can do several different things in accordance with one or more embodiments of the disclosure.

In one embodiment the one or more processors 203 can compute a noise index as a function of the ambient audio signals and the at least some speech extracted by the voice control interface engine 214. The one or more processors 203 can then, in one embodiment, identify a source of the speech. Where the noise index exceeds a predefined criterion, the one or more processors 203 execute a communication operation on one or more of the user interface 205 or the communication circuit 206. Illustrating by example, in one embodiment the one or more processors 203 can send, with the communication circuit 206, a "reminder" text message to a remote electronic device belonging to a repetitive speaker or to a loud persistent speaker. In another embodiment, the one or more processors 203 may cause the audio output device 215 to send out a directional audio message in the direction of the loud speech source. In yet another embodiment, where the source of the auditory pollution is the owner of the electronic device 200, the one or more processors 203 may present a reminder on the display 202 to remind the owner when he generates an excessive office noise pollution in quiet areas.

Figure 3:
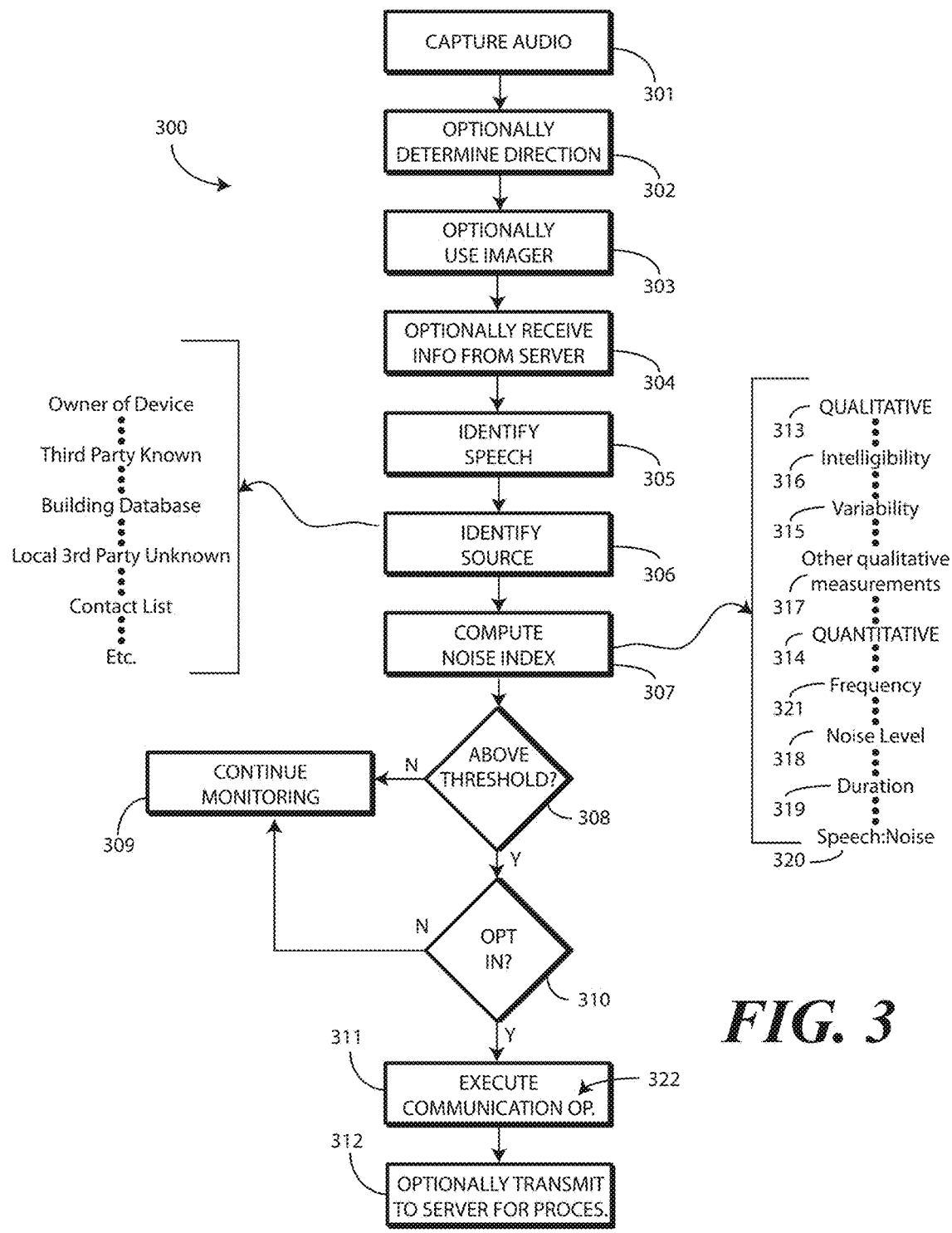
FIG. 3 illustrates one explanatory method in accordance with one or more embodiments of the disclosure.

Turning now to FIG. 3, illustrated therein is one method 300 suitable for execution on the one or more processors (203) of the electronic device (200) in FIG. 2. Beginning with step 301, the method 300 receives and ambient audio signals from an external environment surrounding the housing (201) the electronic device (200).

In one or more embodiments, the ambient audio signals captured at step 301 are captured continuously. Said differently, in one embodiment the audio capture device (212) of the electronic device (200) is always ON. However, in other embodiments a user can select where sounds are captured. The user may not want to use embodiments of the disclosure at, for example, a Tom Waits concert or on the subway. However, they may want to always use embodiments of the disclosure when at the library.

To accommodate this selection, in one embodiment the user is able to define, with the user interface (205) of the electronic device (200), select locations where the ambient audio signals should be captured. In one or more embodiments, the one or more processors (203) are configured to determine, at step 301 with the location detector (211), a location of the electronic device (200). In one or more embodiments the one or more processors are to compute the noise index, described below at step 307, only when the location meets another predefined criterion, such as being within a user-defined audio capture area.

In one or more embodiments, the one or more processors (203) may have stored in memory a distribution of fixed quiet or discussion areas at a given location. This information can be received, for example, from a server complex having access to a floor plan or other location information. Examples of fixed quiet or discussion areas include personal desks, micro-kitchens, office libraries, and so forth. In such embodiments, the one or more processors may compute the noise index, described below at step 307, and or execute a communication operation, described below at step 311, only when the location meets another predefined criterion, such as being within a predefined fixed quiet or discussion area of a given location.

At step 302, the method 300 can optionally determine the direction from which the ambient audio signals were received. For example, the electronic device (200) may include two or more microphones for use in selective beam steering. The one or more processors (203) of the electronic device (200) can then select between the first microphone and the second microphone to beam steer audio reception toward a source of auditory pollution. Thus, in one embodiment an audio capture device (212) of an electronic device (200) comprises a directional microphone, and at step 302 the method 300 includes determining a direction from which the ambient audio signals, or at least some speech extracted therefrom at step 305, was received.

At optional step 303, the method 300 employs an imager (213) to identify the source of the ambient audio signals and/or any speech. As noted above, in one or more embodiments the imager (213) can be configured to identify people within an environment of the electronic device (200). For example, the imager (213) may be able to process a captured image to identify human shapes in the image. Accordingly, in one or more embodiments optional step 303 includes using an imager (213) to determine where people may be oriented within the environment about the electronic device (200), and/or the number of people about the electronic device (200) in three-dimensional space.

Figure 12:
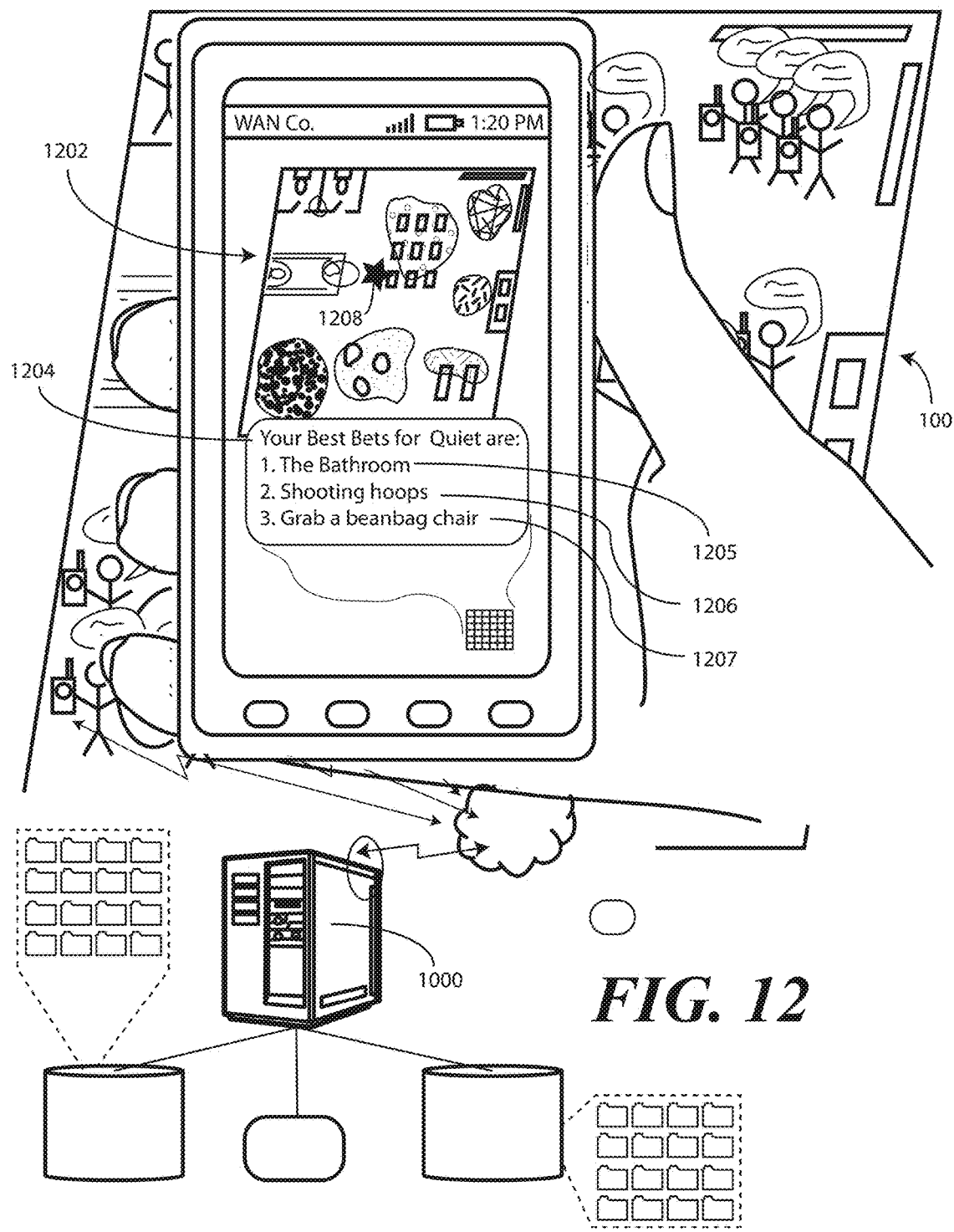
FIG. 12 illustrates another explanatory system in accordance with one or more embodiments of the disclosure.

At optional step 304, the method 300 includes receiving information from a server complex. The information received at step 304 can vary. In one embodiment, this information includes a calendar of events occurring at the location. In another embodiment, this information includes a map comprising a plurality of noise indices at a plurality of locations with each location graphically representing a magnitude of each noise index at the each location. One example of such a map is shown in FIG. 12 below.

At step 305, the method 300 uses the voice control interface engine (214) to process signals received from the audio capture device (212) to identify at least some speech from the ambient audio signals received by the audio capture device (212). At step 306, the method 300 includes optionally identifying the source of the speech. This can be done in any number of ways. In one embodiment, step 306 includes presenting a request on the user interface (205) of the electronic device (200) that the owner of the electronic device (200) provides identifying information to the user interface (205) to identify the speaker. This information can then be stored in the memory (209) future use. In another embodiment, at step 306 the voice control interface engine (214) can use a voice recognition engine to automatically identify speech extracted from ambient audio signals. Alternatively, at step 306 the one or more processors (203) can use repetitive speaker detection and/or identification by probabilistic positioning. Other techniques for identifying the speaker will be obvious to those of ordinary skill in the art having the benefit of this disclosure.

At step 307, the method 300 computes a noise index. In one embodiment, the noise index computed at step 307 is a function of the ambient audio signals and any speech extracted therefrom at step 305. In one embodiment, the noise index computed at step 307 comprises a qualitative measurement 313 of the ambient audio signals and a quantitative measurement 314 of the ambient audio signals.

In one embodiment, the qualitative measurement 313 comprises one or more of a speaker variability measurement 315 or a speaker intelligibility measurement 316. Other qualitative measurements 317 will be obvious to those of ordinary skill in the art having the benefit of this disclosure. In one embodiment, the quantitative measurement 314 comprises one or more of a sound loudness level 318, a duration 319 that the ambient audio signals are above a predefined loudness threshold, or a ratio 320 of the at least some speech to the ambient audio signals. Other examples of the quantitative measurement 314, such as the frequency 321 at which a speaker is identified, will be obvious to those of ordinary skill in the art having the benefit of this disclosure.

Accordingly, in one embodiment at step 307 the method calculates a noise index that is a function of duration 319, speaker intelligibility measurement 316, and sound loudness level 318 of detected spoken interactions, as well as the speaker variability measurement 315 occurring in the same. In one or more embodiments step 307 can be performed at any given time. Alternatively, step 307 can be performed across given periods to provide a summary report for a given period of time such as a day or a week.

At decision 308, the method 300 can determine whether the noise index is above a predetermined threshold. The predetermined threshold will change depending upon what factors are used to compute the noise index. If, for example, the sound loudness level 318 were the only factor used, the predetermined threshold may be a Sound Pressure Level (SPL) measurement in decibels (dB). By contrast, if the noise index computed at step 307 is a function of both qualitative measurements 313 of the ambient audio signals and quantitative measurements 314 of the ambient audio signals, the predetermined threshold may be a numerical value, perhaps between zero and 100, which represents weighted averages of the various qualitative measurements 313 and quantitative measurements 314 that are used. For example, the qualitative measurement 313 of speaker intelligibility measurement 316 may be given a score from one to ten, and this score may be weighted with other factors such as the quantitative measurement 314 of how frequently a speaker has been identified to provide the weighted average. This weighted average can be compared to a predefined numerical scale in one embodiment to determine whether the noise index is above the predefined threshold. Other techniques for establishing predefined thresholds will be obvious to those of ordinary skill in the art. If the noise index is below the predetermined threshold, as determined at decision 308, the method 300 continues monitoring the environment at step 309. In one embodiment, the monitoring at step 309 is continuous using an audio capture device (212) that is "always ON."

If the noise index is above the predefined threshold, the method 300 can optionally determine whether the owner of the electronic device (200) has elected to be notified of such conditions. For instance, in one embodiment the user can "opt in" to notification using the user interface (205) of the electronic device (200). Whether the user has "opted in" to notifications can be confirmed at decision 310. In other embodiments, decision 310 will be omitted and notifications and other communication operations will occur automatically.

At step 311, where the noise index exceeds the predefined criterion, the method 300 executes, with one or more processors (203), a communication operation 322. The communication operation 322 can be executed to deliver information to the user interface (205) of the electronic device (200), to other devices through the communication circuit (206), combinations thereof, or in other ways. For example, in other embodiments the method 300 may execute the communication operation 322 at step 311 by delivering a haptic response to a user.

Figure 4:
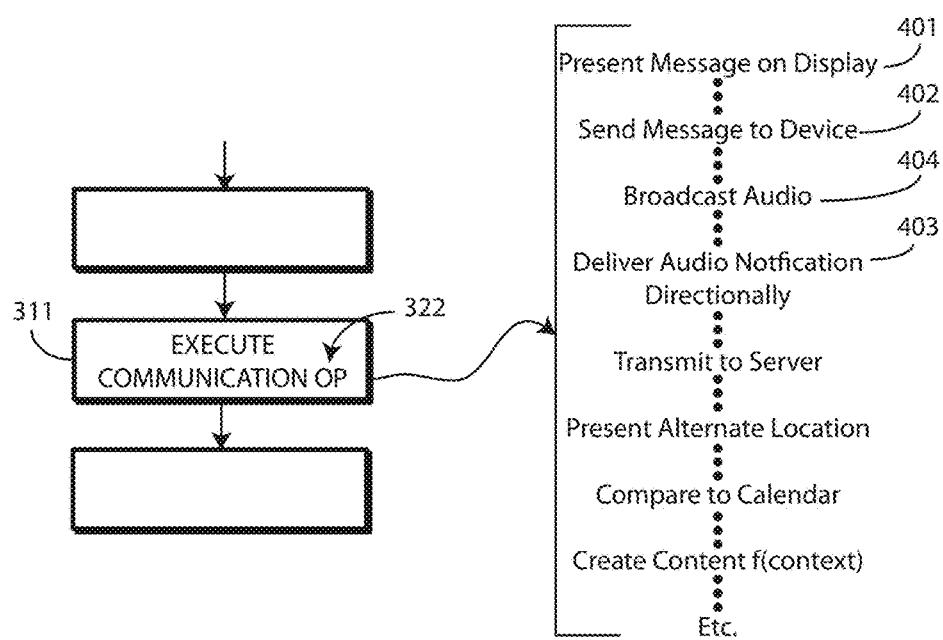
FIG. 4 illustrates another explanatory method in accordance with one or more embodiments of the disclosure.

Turning briefly to FIG. 4, illustrated therein are some explanatory examples of various communication operations that can occur at step 311. In one embodiment, the communication operation 322 can comprise the presentation of a notification 401 on a display of the user interface (205). In one embodiment, the notification indicates that the noise index exceeds the predefined criterion. For example, in one embodiment where the person responsible for the noise index exceeding the predefined criterion is the owner of the electronic device (200), the presentation of the notification 401 can comprise presenting a reminder on the display (202) letting the owner of the electronic device (200) know he or she is generating auditory pollution. Accordingly, in one embodiment the one or more processors (203) of the electronic device (200) can identify (at step 306 of FIG. 3) that the source of the at least some speech is an owner of the electronic device (200). When this occurs, at step 311 the one or more processors (203) can execute the presentation of a notification (401) on a display (202) of the user interface (205), where the notification comprises a request that the owner of the electronic device be quieter.

Figure 5:
FIG. 5 illustrates one explanatory device in operation in accordance with one or more embodiments of the disclosure.

Turning briefly to FIG. 5, such a request 501. In this example, individual 127 is the owner of electronic device 200. The individual 127 is engaging in a loud discussion 502, as indicated by the bold lines, about his dog, Buster. The individual 127 is showing coworkers a picture 503 of Buster on the display 202 of the electronic device 200. The individual 127 is loudly exclaiming what a great dog Buster is, how much he loves Buster, and how he can't wait to get home to see Buster waiting at the door. However, the loud discussion 502 causes the predefined threshold to be exceeded, as determined by decision (308) of FIG. 3. At step (306) of the method (300), the one or more processors (203), working in tandem with the voice control interface engine (214), identify that the source of the at least some speech extracted from ambient audio signals at step (305) are those of individual 127. Accordingly, in one embodiment the one or more processors (203) execute, at step 311, a communication operation 322 comprising presentation of a notification 401 on the display 202 of the user interface (205). Here the notification indicates that the noise index exceeds the predefined threshold by stating, "You're probably disturbing your neighbors." It also includes a request 501 that the owner be quieter, stating, "Be Quiet."

Turning back to FIG. 4, embodiments of the disclosure contemplate that the owner of the electronic device (200) will generally not be the source of auditory pollution. Accordingly, the communication operation 322 executed at step 311 can differ based upon the circumstances. In another embodiment, the one or more processors (203) may identify (at step 306 of FIG. 3) that the source of the at least some speech extracted from the ambient audio signals at step (305) is from a known third party owner of a remote electronic device. Where this is the case, i.e., wherein when the source of the at least some speech comprises the known third party owner of the remote electronic device, the communication operation 322 executed can comprise delivery of an electronic message 402 from the communication circuit (206) to the remote electronic device. In one embodiment, the electronic message comprises a request that the known third party owner of the remote electronic device be quieter.

Figure 6:
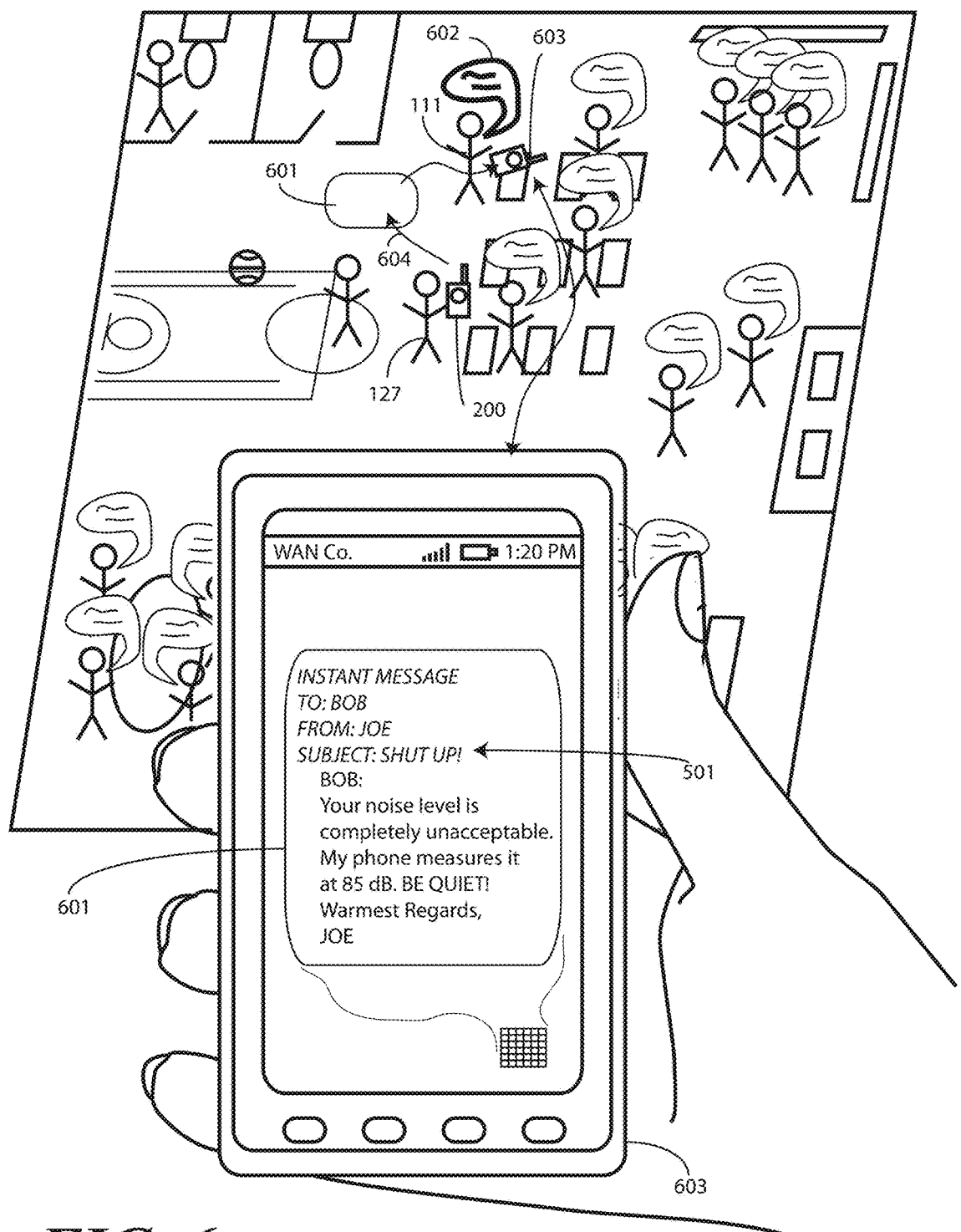
FIG. 6 illustrates another explanatory device in operation in accordance with one or more embodiments of the disclosure.

Turning briefly to FIG. 6, illustrated therein is such an electronic message 601. In this example, person 111 is bragging about his favorite sports team with a friend in a loud discussion 602 carried out using a remote electronic device 603 operating in speakerphone mode. The loud discussion 602 is indicated by the bold lines. Meanwhile, individual 127 is trying to work on his monthly TPS report, and in particular the cover sheet that should accompany the TPS report. Individual 127 is trying to concentrate because he has received three different memoranda referencing the cover sheet's format. However, the loud discussion 602 interrupts this concentration. It also causes the predefined threshold to be exceeded, as determined by decision (308) of FIG. 3.

At step (306) of the method (300), the one or more processors (203), working in tandem with the voice control interface engine (214), identify that the source of the at least some speech extracted from ambient audio signals at step (305) are those of a known third party, i.e., person 111, whose contact information is stored within electronic device 200. Accordingly, in one embodiment the one or more processors (203) execute, at step 311, a communication operation 322 comprising the delivery 604 of an electronic message 601 to the remote electronic device 603 belonging to the third party, who is here person 111. In this example, the electronic message 601 indicates that the noise index exceeds the predefined threshold by stating, "My phone measures [your loud discussion 602] at 85 dB." It also includes a request 501 that person 111 be quieter, stating, "Be Quiet."

Figure 7:
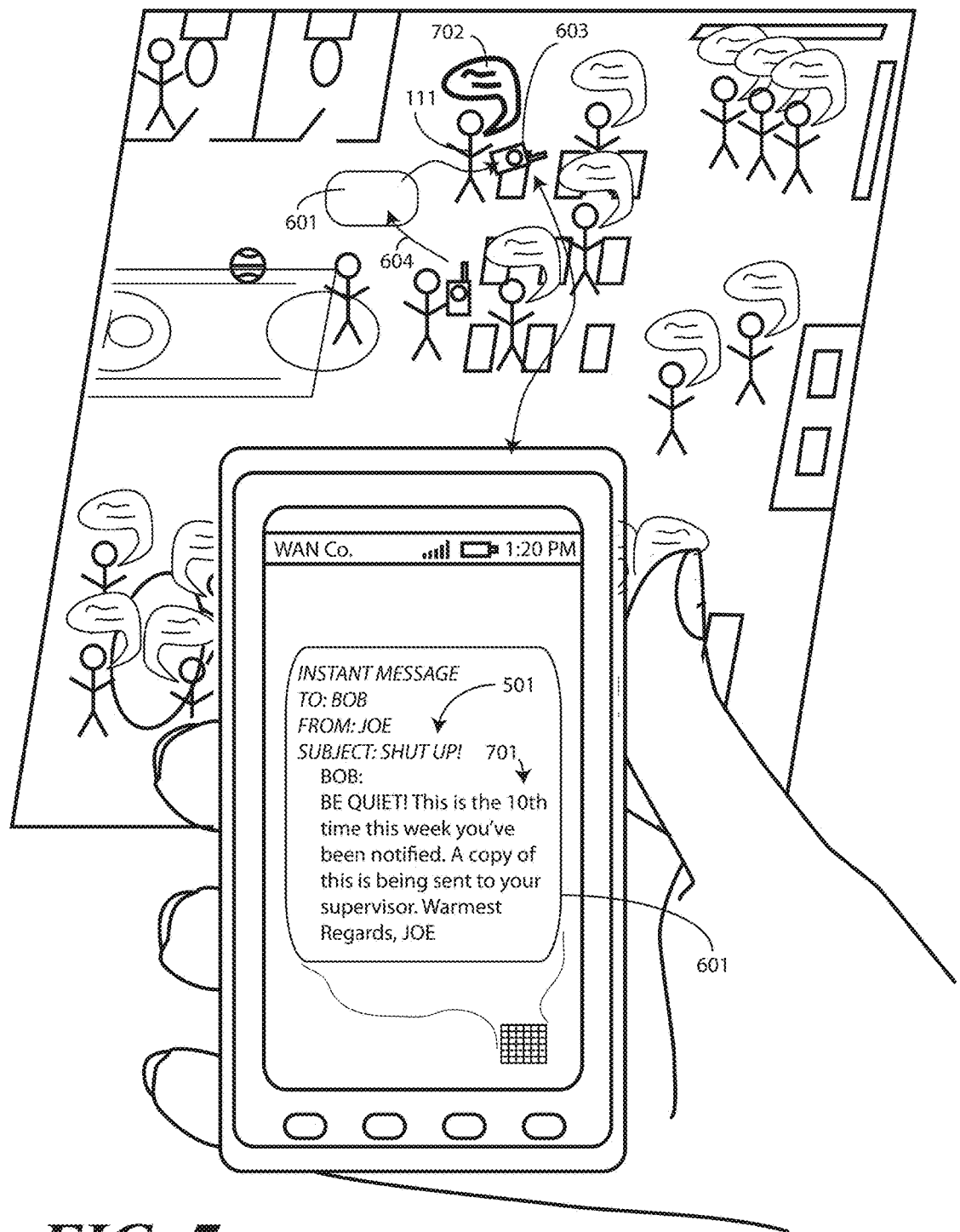
FIG. 7 illustrates another explanatory device in operation in accordance with one or more embodiments of the disclosure.

In one or more embodiments, the electronic message 601 can include content that is a function of frequency. Turning briefly to FIG. 7, in one embodiment the one or more processors (203) are further configured to determine a frequency that the source of the at least some speech is identified. Here, person 111 is again up to his usual shenanigans. However this time, his loud discussion 702 turns out to be a fight with his girlfriend, again being handled over speakerphone. As before, at step (306) of the method (300), the one or more processors (203), working in tandem with the voice control interface engine (214), identify that the source of the at least some speech extracted from ambient audio signals at step (305) are from our good friend, person 111. However, additionally the one or more processors (203) are further configured to determine a frequency that the source of the at least some speech is identified. Where this occurs, the one or more processors (203) execute, at step (311), a communication operation (322) comprising the delivery 604 of an electronic message 601 to the remote electronic device 603 belonging to person 111. In this example, the electronic message 601 includes content 701 that is a function of frequency, namely, "This is the 10$^{th}$ time this week you've been notified." The electronic message 601 also includes a request 501 that person 111 be quieter, stating, "Be Quiet." Further, frustrated to no end, the electronic message 601 warns that a copy of this message is being sent to the supervisor of person 111.

Turning now back to FIG. 4, embodiments of the disclosure contemplate that the noisy party will not always be identifiable. Even where they are identifiable, the contact information corresponding to a remote electronic device belonging to the auditory polluter will not be known. Advantageously, embodiments of the disclosure provide still other mechanisms for quelling the auditory pollution.

Recall from above that in one or more embodiments, when equipped with directional microphones, embodiments of the disclosure are capable of detecting the direction of noise sources. Where additionally equipped with directional loudspeakers, in one or more embodiments the communication operation 322 executed at step 311 can comprise the delivery of an audio signal 403 that is directional. Said differently, in one embodiment where the user interface (205) further comprising a directional audio output device (215), the communication operation 322 occurring at step 311 can comprise the delivery of a notification in the form of an audio signal 403 from the directional audio output device (215) delivered along the direction from which the at least some speech was received. If the direction noted was from the bottom right corner of the electronic device (200), a directional loudspeaker may emit an announcement, directionally, stating, "Whoever is being loud over there needs to shut up." Where the direction is not known, the audio output device (215) may deliver a general audio notification 404.

Figure 8:
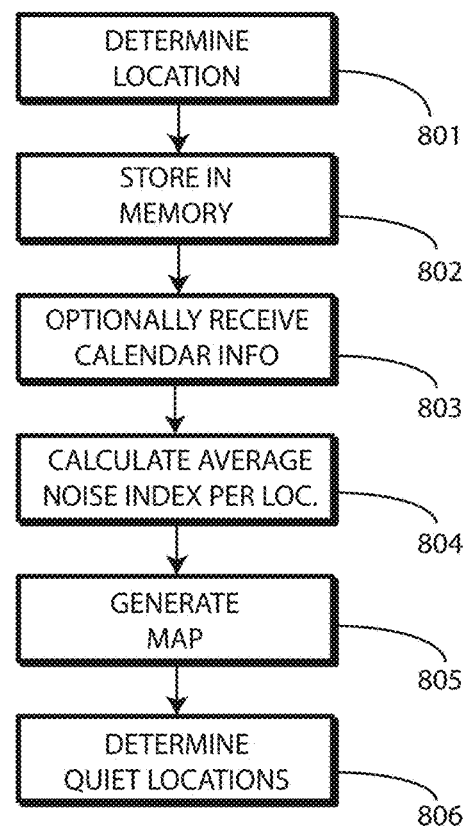
FIG. 8 illustrates another explanatory method in accordance with one or more embodiments of the disclosure.

Other communication operations can occur as well. However, in some circumstances additional method steps will need to be performed prior to discussing these other communication operations. Turning now to FIG. 8, illustrated therein are some of these additional, and optional method steps.

At step 801, the one or more processors (203) of the electronic device (200) can determine, using the location detector (211), a location of the electronic device (200). In one embodiment, this occurs while audio is being captured at step (301) of method (300). At step 802, the one or more processors (203) store the location of the electronic device (200). The one or more processors (203 can also store at step 803 the noise index at the location in the one or more memory devices. In one embodiment, this information is stored in a map of a plurality of locations with each location having associated therewith with a corresponding noise index.

At optional step 803, the one or more processors (203) can receive, with the communication circuit (206), calendar information from a remote server. Embodiments of the disclosure contemplate that businesses, companies, organizations, academic institutions, governmental agencies, social networks, groups of friends, and so forth may access a common server with a common calendaring application operating thereon. Additionally, some businesses, companies, organizations, academic institutions, governmental agencies, social networks, groups of friends, and so forth may have policies that govern meetings and group events. Illustrating by example, a business may have a mandated lunch hour from 1:30 PM to 2:00 PM. That same business may have a mandatory rule that no meeting can occur for more than ninety minutes without including a fifteen-minute break.

Embodiments of the disclosure further contemplate that some group events will affect the auditory pollution in a room. For example, a networking meeting during lunch hour is likely to be very noisy. By contrast, there should be little to no noise at midnight. These expectations can be derived from the calendaring information that is optionally received at step 803.

At step 804, the one or more processors (203) can compute an average noise index for each location. In one or more embodiments where the optional calendaring information is received at step 803, the one or more processors (203) can, at step 804, also determine whether an event that is occurring during the time the ambient audio signals are captured at step (301) of FIG. 3 meets another predefined criterion. Illustrating by example, the other predefined criterion may be the occurrence of a meeting, or a lunch break, or other company function. Where this is the case, at step 804 the one or more processors (203) can adjust the noise index. For instance, the one or more processors (203) might scale the noise index down during lunch so that the electronic device (200) does not constantly send messages to coworkers asking them to shut up.

At step 805, the one or more processors (203) can generate a map illustrating the plurality of locations and an indication of the noise index at each location. In one embodiment, step 804 can include presenting the map of the plurality of locations on a display (202) of the user interface (205) with the each location comprising a graphical presentation indicative of the average noise index.

Figure 9:
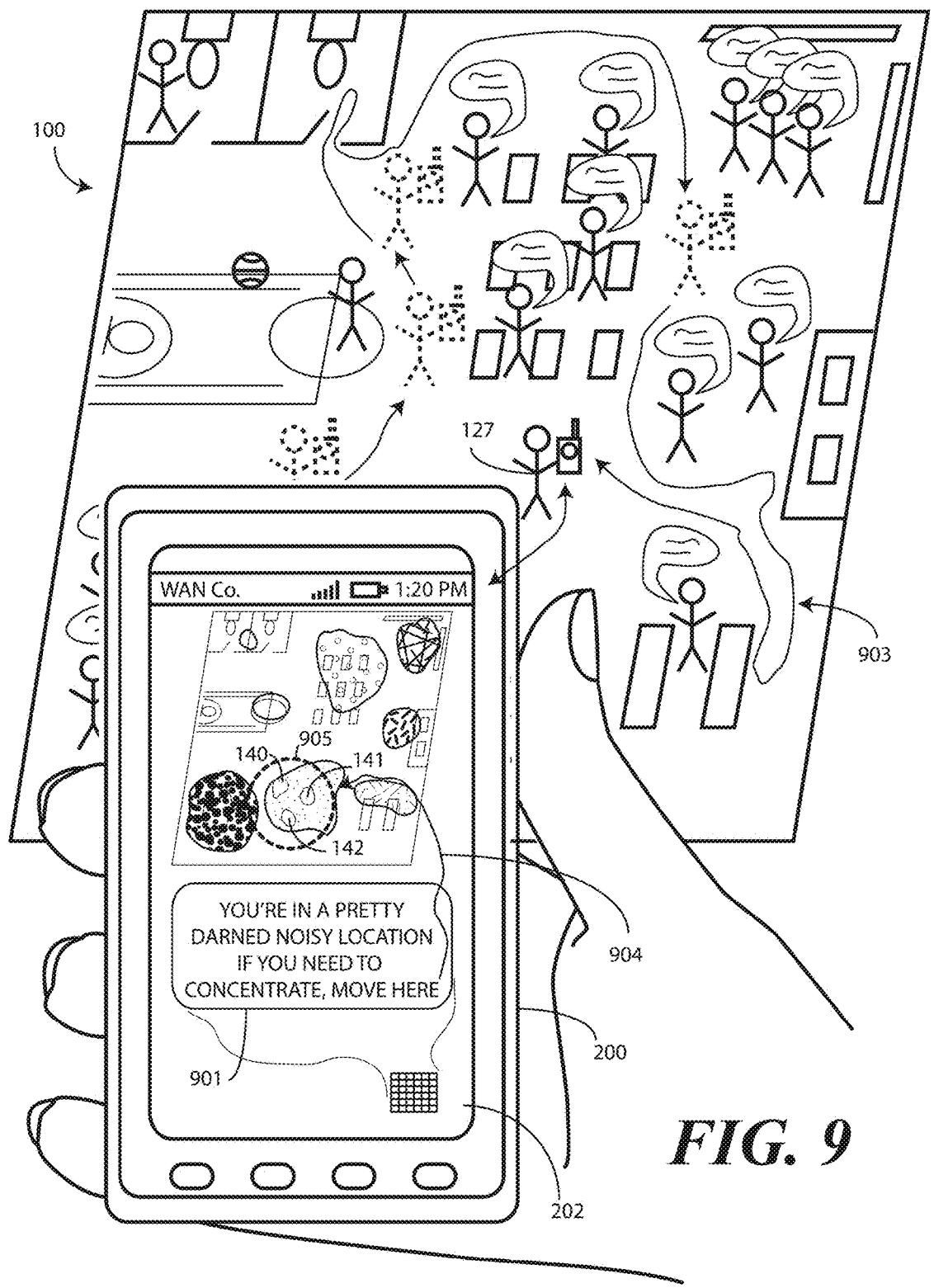
FIG. 9 illustrates another explanatory device in accordance with one or more embodiments of the disclosure.

In one or more embodiments, the one or more processors (203) can even select, at step 806, another location from the map of the plurality of locations where the average noise index for the another location is less than the noise index of the ambient audio signals at a current location. Step 806 can also include the presentation of an indication of the another location on a display of the user interface. Turning briefly to FIG. 9, such a notification 901 is illustrated.

As shown in FIG. 9, the one or more processors (203) of the electronic device 200 have generated a map 902 as individual 127 has traveled 903 about the open space office design 100 in accordance with step (805) of FIG. 8. In this embodiment, the map 902 is configured as a "heat map" with various locations of the map 902 comprising a graphical presentation indicative of the average noise index occurring at that location. Here, the graphical presentations comprise shapes having different strokes and fills with more ink corresponding to more noise. Other configurations of heat maps will be obvious to those of ordinary skill in the art having the benefit of this disclosure.

Additionally, the one or more processors (203) have selected 904, at step (805), an alternate location 905 where the ambient noise environment is quieter. Concurrently, the one or more processors (203) present both the map 902 and a notification 901 on the display 202 letting individual 127 know that the kitchen/lunchroom area is pretty darned noisy and that a quieter zone is available near the beanbag chairs 140,141,142.

Turning now back to FIG. 3, note that to this point, most of the communication operations occurring at step 311 have been localized, i.e., the electronic device (200) captures ambient audio signals at step 301, processes them at steps 302,303,304,305,306, and acts on them in certain situations such as when the noise index exceeds a predefined threshold as determined at decision 308. However, embodiments of the disclosure are not so limited. In other embodiments, as shown at step 312, the one or more processors (203) can be further configured to transmit, with the communication circuit (206), information to a remote server. Illustrating by example, in one embodiment the map (902) of the plurality of locations generated at step (805) of FIG. 8 may be transmitted to a remote server complex for further processing.

Figure 10:
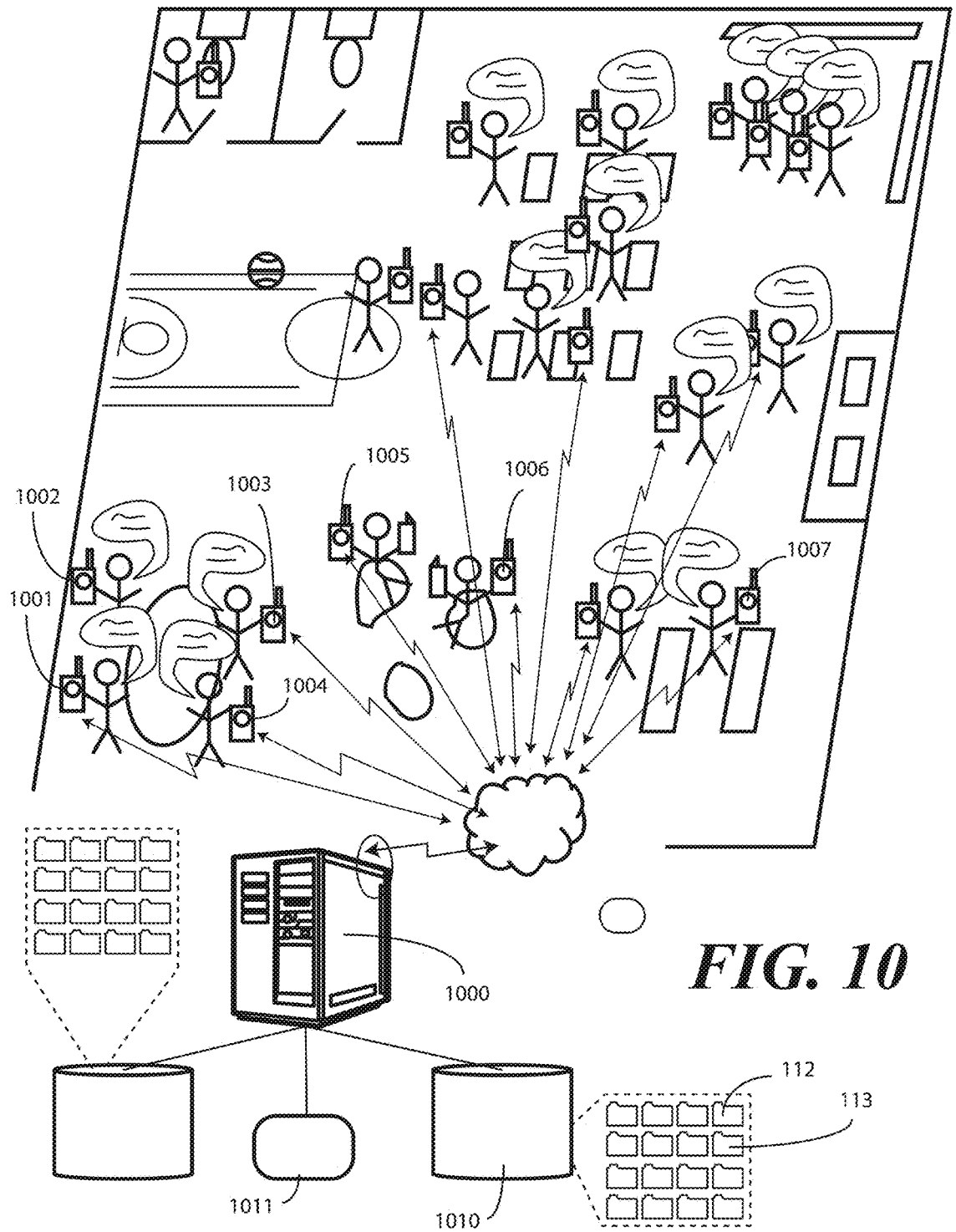
FIG. 10 illustrates one explanatory system in accordance with one or more embodiments of the disclosure.

Turning now to FIG. 10, illustrated therein is such a server complex 1000. In one or more embodiments, an infrastructure or electronic architectural framework is configured to provide an end-to-end solution to reduce the auditory pollution experienced by the system's users. In one embodiment, such a system includes two primary components: a server complex 1000 having one or more processors 1011 and one or more mobile communication devices 1002,1003, 1004,1005,1006,1007. Each mobile communication device 1002,1003,1004,1005,1006,1007 can be configured as was electronic device (200) of FIG. 2.

In one or more embodiments, the server complex 1000 includes a database 1010 or other storage data of floor plans of office spaces, calendaring information, device identification information, and so forth. From this information, the server complex 1000 can receive noise index information or ambient audible signal information from the mobile communication devices 1002,1003,1004,1005,1006,1007. The server complex 1000 can then process this information in accordance with one or more methods. One explanatory method is shown in FIG. 11.

Figure 11:
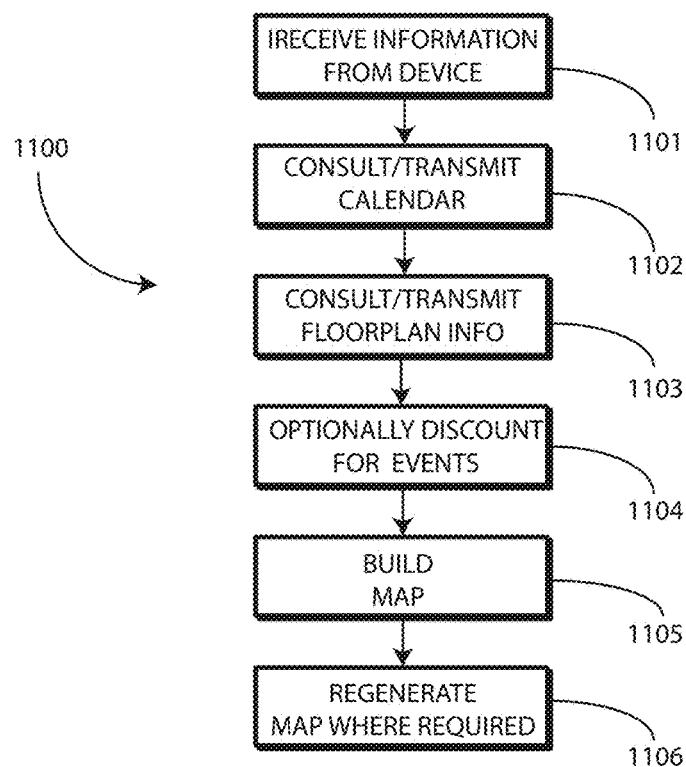
FIG. 11 illustrates another explanatory method in accordance with one or more embodiments of the disclosure.

Turning now to FIG. 11, in one embodiment at step 1101 the server complex (1000) can receive, from the one or more mobile communication devices (1002,1003,1004,1005, 1006,1007), a noise index and a location where the noise index was measured. In one or more embodiments, the information received at step 1101 can include one or more noise indices each comprising a function of ambient audio signals of an environment about the one or more electronic devices, respectively, and at least some speech identified from the ambient audio signals.

At optional step 1102, the server complex (1000) can, with the one or more processors (1011), access a calendaring application (1012) operating at the server complex to obtain a calendar of events occurring at the locations for which information was received at step 1101. In one or more embodiments, step 1102 also includes consulting common calendaring applications operating on the one or more processors (1011) of the server complex (1000) to determine one or both of events occurring and/or any applicable policies that govern meetings and group events. The server complex (1000) can determine whether an event occurring at any of the locations matches a predefined criterion, such as a meeting or lunch break that may indicate higher levels of ambient noise. Where this is the case, the server complex (1000) can optionally, at step 1104, scale any noise indices received at step 1101 as a function of the predefined criterion. Thus, if a meeting is occurring, any received noise indices may be discounted due to the expected elevated noise levels during the meeting.

At optional step 1103, the server complex (1000) can consult a floor plan (1013) to determine architectural layouts of any open office spaces or other spaces being served by the server complex (1000). At step 1105, the server complex (1000) can generate a map comprising a plurality of noise indices at a plurality of locations with each location graphically representing a magnitude of each noise index at the each location.

At step 1106, since the method 1100 of FIG. 11 can be continuous, the server complex (1000) can regenerate the map as necessary. Illustrating by example, where calendaring information is receive at step 1102, and the information received at step 1101 is discounted in accordance with one or more events occurring, the server complex (1000) may, at step 1106, regenerate the map with the each location graphically representing a scaled magnitude of the each noise index at the each location. Whether or not this optional step 1106 occurs, the map can be delivered to the mobile communication devices (1002,1003,1004,1005,1006,1007) at step 1107 and It should be noted that the server complex (1000) may execute the steps of any of the previous methods as well, including those in FIG. 3 and FIG. 8. Accordingly, any or all of the functions described above with reference to those figures could be offloaded to the server complex (1000). One example of this is shown in FIG. 12.

Turning now to FIG. 12, the server complex 1000 has generated a heat map 1202 showing where noisier and less noisy locations are in the open space office design 100. Additionally, the server complex 1000 has selected 1204, three alternate locations 1205,1206,1207 from the user's location 1208 where the ambient noise environment is quieter, i.e., alternate locations 1205,1206,1207 with lower noise indices.

Embodiments of the disclosure, as described above, provide devices, methods, and systems for receiving, with an audio capture device, ambient audio signals from an environment, processing, with a voice control interface engine operable with the audio capture device, electrical signals corresponding to the ambient audio signals to identify at least some speech from the ambient audio signals, computing, with one or more processors operable with the voice control interface engine, a noise index as a function of the ambient audio signals and the at least some speech, identifying, with the one or more processors, a source of the at least some speech, and delivering, with the one or more processors, a communication to the source of the at least some speech. Advantageously, embodiments of the disclosure can track the locations of an electronic device as it annotates the amounts of ambient noise at different locations in an open floor plan design. Embodiments of the disclosure can determine the location of quiet areas, such as work desks, and discussion areas, such as conference rooms or kitchen areas, from floor plan information and calendaring information. Accordingly, and advantageously, embodiments of the disclosure can determine where the levels of noise are expected to be low.

Embodiments of the disclosure can segment the speech noise by different speakers and can cluster the time intervals of a repetitive speaker. Embodiments of the disclosure can send "reminder" text messages to repetitive speakers or to a loud persistent speaker. Embodiments of the disclosure can determine an electronic device's owner and can remember it for future use. Alternatively, embodiments of the disclosure can identify the repetitive speaker automatically. As an alternative to electronic communications, audio messages, either directional or non-directional, can be emitted to quell auditory pollution. Embodiments of the disclosure can identify an electronic device's owner by voice. Moreover, embodiments of the disclosure can monitor and remind the owner when he generates an excessive office noise pollution in quiet areas.

In one or more embodiments, embodiments of the disclosure can calculate a noise index. This noise index can be a function of length, intelligibility, loudness of the spoken interaction, as well as the speaker variability in the same. Embodiments of the disclosure can provide the noise index instantly at any given time. Alternatively, embodiments of the disclosure can provide a summary report for a given period of time such as a day or week. In one or more embodiments, an owner of an electronic device can review his office noise exposure at any moment during the day. As described above, embodiments of the disclosure can be set to alert the owner about high office noise levels. When several electronic devices configured in accordance with one or more embodiments of the disclosure are operating in tandem with a server complex, a heat map can be generated showing the levels of office noise at different locations on the floor. These are just a few of the advantages offered by embodiments of the disclosure. Others will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising
a user interface;
a communication circuit;
an audio capture device to receive ambient audio signals from an environment about the electronic device;
a voice control interface engine, operable with the audio capture device to process signals received from the audio capture device to identify at least some speech from the ambient audio signals; and
one or more processors operable with the voice control interface engine to:
compute a noise index as a function of the ambient audio signals and the at least some speech;
identify a source of the at least some speech; and
where the noise index exceeds a predefined criterion, execute a communication operation on one or more of the user interface or the communication circuit.

2. The electronic device of claim 1, the communication operation comprising presentation of a notification on a display of the user interface, the notification indicating that the noise index exceeds the predefined criterion.

3. The electronic device of claim 1, the one or more processors further to identify that the source of the at least some speech is an owner of the electronic device, wherein when the source of the at least some speech comprises the owner of the electronic device the communication operation comprises presentation of a notification on a display of the user interface, the notification comprising a request that the owner of the electronic device be quieter.

4. The electronic device of claim 1, the one or more processors further to identify that the source of the at least some speech is a known third party owner of a remote electronic device, wherein when the source of the at least some speech comprises the known third party owner of the remote electronic device the communication operation comprises delivery of an electronic message from the communication circuit to the remote electronic device, the electronic message comprising a request that the known third party owner of the remote electronic device be quieter.

5. The electronic device of claim 1, the noise index comprising a qualitative measurement of the ambient audio signals and a quantitative measurement of the ambient audio signals.

6. The electronic device of claim 5, the qualitative measurement comprising one or more of a speaker variability measurement or a speaker intelligibility measurement.

7. The electronic device of claim 5, the quantitative measurement comprising one or more of a sound loudness level, a duration that the ambient audio signals are above a predefined loudness threshold, or a ratio of the at least some speech to the ambient audio signals.

8. The electronic device of claim 1, the audio capture device comprising a directional microphone, the one or more processors further to determine a direction from which the at least some speech was received from the directional microphone.

9. The electronic device of claim 8, the user interface further comprising a directional audio output, the communication operation comprising an audio notification from the directional audio output delivered along the direction from which the at least some speech was received.

10. A method, comprising:
receiving, with an audio capture device, ambient audio signals from an environment;
processing, with a voice control interface engine operable with the audio capture device, electrical signals corresponding to the ambient audio signals to identify at least some speech from the ambient audio signals;
computing, with one or more processors operable with the voice control interface engine, a noise index as a function of the ambient audio signals and the at least some speech;
identifying, with the one or more processors, a source of the at least some speech; and
delivering, with the one or more processors, a communication to the source of the at least some speech.

11. The method of claim 10, further comprising:
determining, with a location detector, a location; and
storing, in one or more memory devices operable with the one or more processors, the location and the noise index at the location in a map of a plurality of locations with each location having associated therewith with a corresponding noise index.

12. The method of claim 11, further comprising:
computing, with the one or more processors, an average noise index for the each location;
selecting, with the one or more processors, another location from the map of the plurality of locations where the average noise index for the another location is less than the noise index of the ambient audio signals; and
presenting, with the one or more processors, an indication of the another location on a display of a user interface.

13. The method of claim 11, further comprising:
receiving, with a communication circuit from a remote server complex, a calendar of events occurring at the location;
determining, with the one or more processors, whether an event occurring during the ambient audio signals meets another predefined criterion; and
where the event occurring during the ambient audio signals meets the another predefined criterion, adjusting the noise index with the one or more processors.

14. The method of claim 11, further comprising:
computing, with the one or more processors, an average noise index for the each location; and
presenting, with the one or more processors, the map of the plurality of locations on a display of a user interface with the each location comprising a graphical presentation indicative of the average noise index.

15. The method of claim 11, further comprising transmitting, with a communication circuit, the map of the plurality of locations to a remote server complex for further processing.

16. The method of claim 10, further comprising determining, with the one or more processors, a frequency that the source of the at least some speech is identified, wherein:
the delivering comprising delivering a notification;
the notification comprising content that is a function of the frequency.

17. The method of claim 10, further comprising:
determining, with a location detector, a location; and
computing the noise index only when the location meets another predefined criterion.

* * * * *